(12) United States Patent
Drewer

(10) Patent No.: US 10,766,547 B2
(45) Date of Patent: Sep. 8, 2020

(54) UTILITY ARMS FOR EXTENSION FROM A FIFTH WHEEL KINGPIN AND RELATED METHODS

(71) Applicant: Christopher B. Drewer, Greer, SC (US)

(72) Inventor: Christopher B. Drewer, Greer, SC (US)

( * ) Notice: Subject to any disclaimer, the term of this patent is extended or adjusted under 35 U.S.C. 154(b) by 189 days.

(21) Appl. No.: 15/989,108

(22) Filed: May 24, 2018

(65) Prior Publication Data
US 2018/0339737 A1  Nov. 29, 2018

Related U.S. Application Data

(60) Provisional application No. 62/511,174, filed on May 25, 2017.

(51) Int. Cl.
*B62D 53/08* (2006.01)
*B62D 53/10* (2006.01)

(52) U.S. Cl.
CPC ..... *B62D 53/0842* (2013.01); *B62D 53/0871* (2013.01); *B62D 53/10* (2013.01)

(58) Field of Classification Search
CPC .. B62D 53/0842; B60R 2011/004; B60R 9/06
USPC ................................. 280/507; 224/518, 519
See application file for complete search history.

(56) References Cited

U.S. PATENT DOCUMENTS

| | | | | |
|---|---|---|---|---|
| 5,890,723 | A * | 4/1999 | Benoit | A63C 17/067 280/11.221 |
| 6,186,530 | B1 * | 2/2001 | Zilm | B62D 53/0828 280/423.1 |
| 6,357,899 | B1 * | 3/2002 | Craven | B60Q 1/2661 362/485 |
| 2002/0092330 | A1 * | 7/2002 | Hurst | B62D 53/085 70/14 |
| 2006/0266725 | A1 * | 11/2006 | Coushaine | B60P 3/36 211/95 |
| 2014/0054427 | A1 * | 2/2014 | Garceau | B60D 1/66 248/157 |
| 2016/0001749 | A1 * | 1/2016 | Kimener | B60S 9/04 414/800 |

\* cited by examiner

*Primary Examiner* — Tony H Winner
(74) *Attorney, Agent, or Firm* — J. Bennett Mullinax, LLC

(57) ABSTRACT

Utility arm apparatuses for securement to a kingpin of a fifth wheel coupling of a trailer and related methods are provided herein. A utility arm apparatus can include an elongate body having an attachment end and a utility end. The attachment end can include a recessed portion for receiving a neck portion of a kingpin of a fifth wheel coupling secured to the trailer such that the utility end extends outward from the kingpin past an end of the trailer. The utility arm apparatus can further include a utility device secured to the utility end of the elongate body such that the utility device is positioned past the end of the trailer when the attachment end of the elongate body is secured to the kingpin.

20 Claims, 16 Drawing Sheets

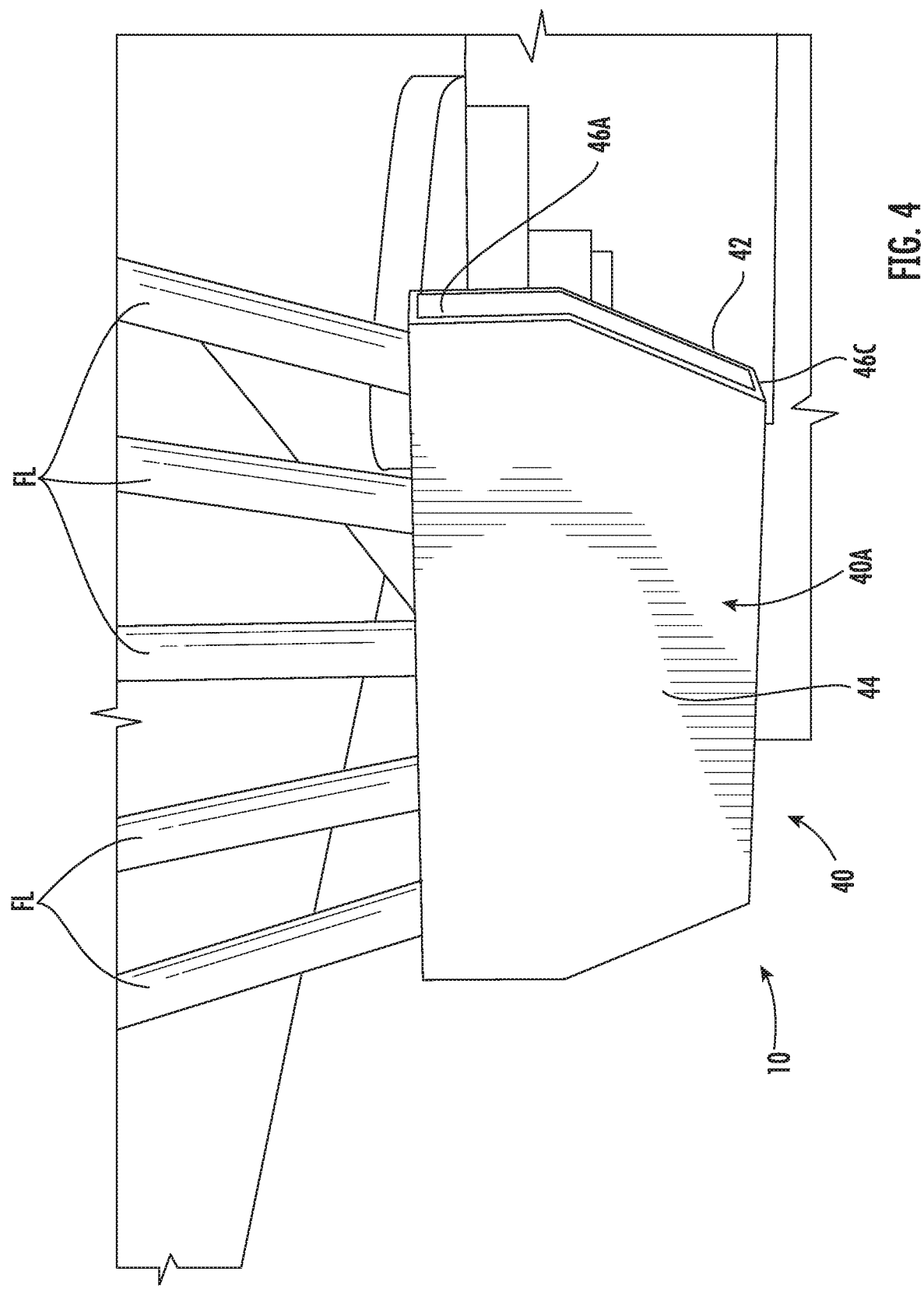

UTILITY ARMS FOR EXTENSION FROM A FIFTH WHEEL KINGPIN AND RELATED METHODS

RELATED APPLICATIONS

This application claims priority to and the benefit of the filing date of U.S. Provisional Patent Application Ser. No. 62/511,174, filed May 25, 2018, the disclosure of which is incorporated herein by reference in its entirety.

TECHNICAL FIELD

The present subject matter relates to various utility arms for attachment to and extension from a fifth wheel kingpin and related methods. In particular, the present subject matter relates to various utility arms that can be secured to a kingpin of a fifth wheel coupling with a portion of the utility arm extending past an end of a trailer to which the kingpin is attached.

BACKGROUND

Fifth-wheel couplings provide the link between a trailer, such as a recreational vehicle, camper or a semi-trailer, and a towing vehicle, such as a pickup truck, a tow truck, a semi-tractor, or a leading trailer. The term "fifth wheel coupling" comes from a similar coupling used on four-wheel horse-drawn carriages and wagons that allowed the front axle assembly to pivot in the horizontal plane, to facilitate turning. The fifth wheel coupling comprises a kingpin that extends downward from a front end portion of the trailer, and a horseshoe-shaped hitch device or latch assembly, which is sometimes referred to as a fifth wheel on the rear of the towing vehicle. During towing, the kingpin rotates within the fixed fifth wheel as needed to allow the trailer to turn as the towing vehicle to which the latch assembly is attached turns. In particular, the kingpin rotates within the latch assembly as the trailer rotates behind the towing vehicle. Accordingly, the latching assembly captures and locks the kingpin in place in order to pull the towed vehicle. To reduce friction, grease is applied to the surface of the fifth wheel. In some cases, this fifth wheel arrangement is reversed with the kingpin attached to the towing vehicle and the latching assembly or hitch attached to the item to be towed.

For campers and other trailers, once the campers or trailers are uncoupled from the towing vehicle, the kingpin of the fifth wheel coupling is no longer needed for any functional use and extends downward from the camper or other trailer exposed and ready for the next time the camper or other trailer is to be attached to the latch assembly and towed by the towing vehicle. Thus, the only purpose for the fifth wheel kingpin on a camper or other trailer is to provide a linking mechanism for towing the respective camper or other trailer. For example, with a camper, the fifth wheel kingpin is not being used when the camper is at a camp site being occupied and used for camping purposes.

While not earlier recognized, the kingpin of the fifth wheel coupling that resides on a camper or trailer provides a mechanism that allows decorative and functional items to be secured to the camper or trailer.

SUMMARY

The present subject matter provides utility arms for attachment to and extension from a fifth wheel kingpin and related methods. In particular, the present subject matter relates to utility arms that can be secured to a kingpin of a fifth wheel coupling with a portion of the utility arm extending past an end of a trailer to which the kingpin is attached. Methods related to the manufacture and use of the utility arms disclosed herein are also provided.

Thus, it is an object of the presently disclosed subject matter to provide utility arm apparatuses as well as methods related thereto. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which:

FIG. 4 illustrates a front perspective view of the embodiment of the utility arm apparatus according to FIG. 1;

Figure 1:
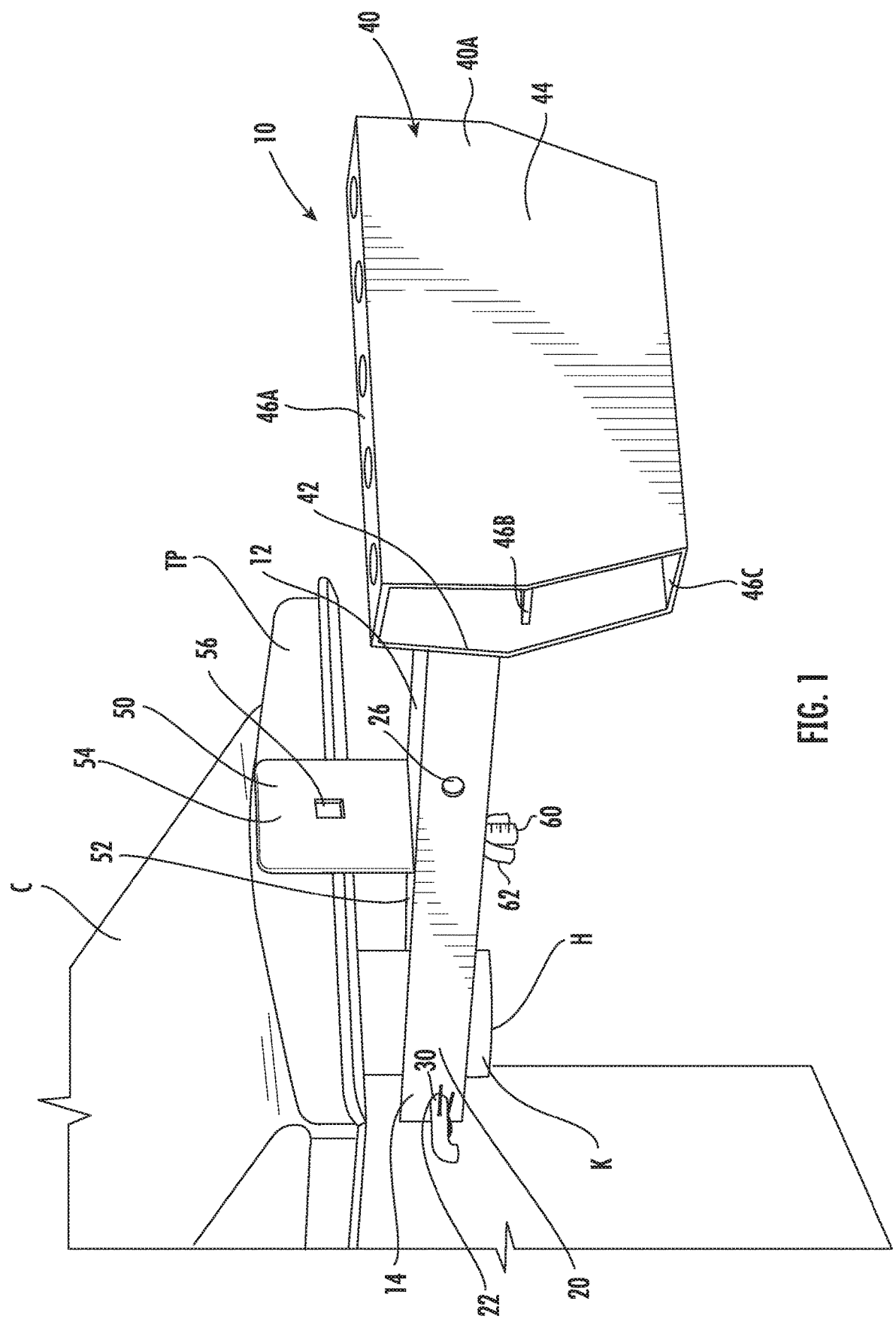
FIG. 1 illustrates a perspective view of an embodiment of a utility arm apparatus according to the present subject matter in use on an embodiment of a camper.
Figure 2:
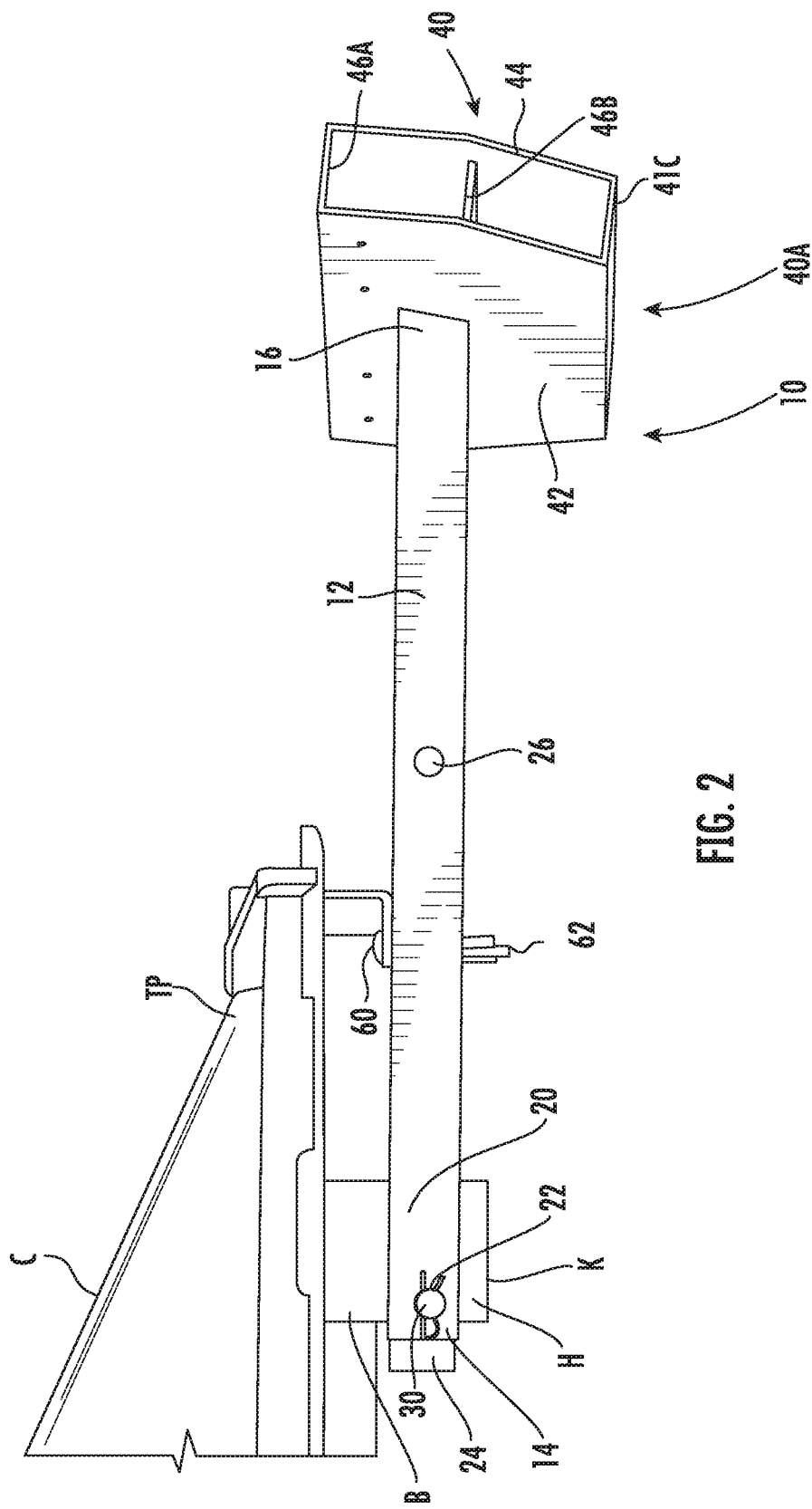
FIG. 2 illustrates a side perspective view of the embodiment of the utility arm apparatus according to FIG. 1.

Repeat use of reference characters in the present specification and drawings is intended to represent the same or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus, it is intended that the present subject matter cover such modifications and variations as come within the scope of the appended claims and their equivalents. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Similarly, when a feature is being described in the present disclosure as "on" or "over" another feature, it is to be understood that the features can either be directly contacting each other or have another feature or space between the features, unless expressly stated to the contrary. Thus, these terms are simply describing the relative position of the features to each other and do not necessarily mean "on top of" since the relative position above or below depends upon the orientation of the apparatus to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of the subject matter and are not intended to limit the scope of the subject matter disclosed herein.

As disclosed herein, utility arms for attachment to and extension from a kingpin of a fifth wheel coupling of a trailer, such as a semi-trailer, horse trailer, a camper, or the like, are provided. For example, the utility arms that can be secured to a kingpin of a fifth wheel coupling with a portion of the utility arm extending past an end of a trailer to which the kingpin is attached. In some embodiments, a utility arm apparatus for securement to a kingpin of a fifth wheel coupling of a trailer is provided with the utility arm apparatus comprising an elongate body having an attachment end and a utility end. The attachment end can comprise a recessed portion for receiving a neck portion of the kingpin of the fifth wheel coupling that is secured to the trailer such that the utility end extends outward from the kingpin of the fifth wheel past an end of the trailer from which the kingpin extends. Additionally, the utility arm apparatus can comprise a locking pin for insertion into apertures in the recess portion for securing the kingpin at the attachment end. The utility apparatus can further comprise a utility device, such as a flag holder, commercial signage, other sign displays, or a bicycle rack. The utility device is secured to the utility end of the elongate body such that the utility device is positioned past the end of the trailer. In some embodiments, an adjustable abutment brace can also be provided that can aid in holding the utility arm stationary when the utility arm is attached to the kingpin of the fifth wheel coupling. Embodiments of such utility arm apparatuses are discussed in more detail below in references to the figures.

Referring to FIGS. 1-13, an embodiment of a utility arm apparatus, generally designated 10, is shown that is attached to a trailer, such as a camper C. The utility arm apparatus 10 comprises an elongate body 12 having an attachment end 14 and a utility end 16. The attachment end 14 can comprise a recessed portion 20 for receiving a neck portion N (see FIGS. 3B and 14) of a kingpin K of a fifth wheel coupling, which can be part of a towing package TP that is secured to a trailer, such as the camper C. For example, the recessed portion 20 can have sidewalls 20A that extend outward forming an open end of the recessed portion 20 for receiving a neck portion N of a kingpin K such that the utility end 16 extends outward from the kingpin K of the fifth wheel coupling past an end $C_1$ of the camper C from which the kingpin K extends. Thus, the length of the elongate body 12 can vary depending on the configuration of the trailer, such as camper C, to which the utility arm apparatus is being attached. The length of the elongate body 12 can be a distance that permits the utility end 16 to extend outward past an end of a trailer. To hold the attachment end 14 to the neck portion N of the kingpin K, the utility arm apparatus 10 can also comprise a locking pin 30 for insertion into apertures 22 in the sidewalls 20A of the recess portion 20 for securing the kingpin K at the attachment end 14.

Figure 13:
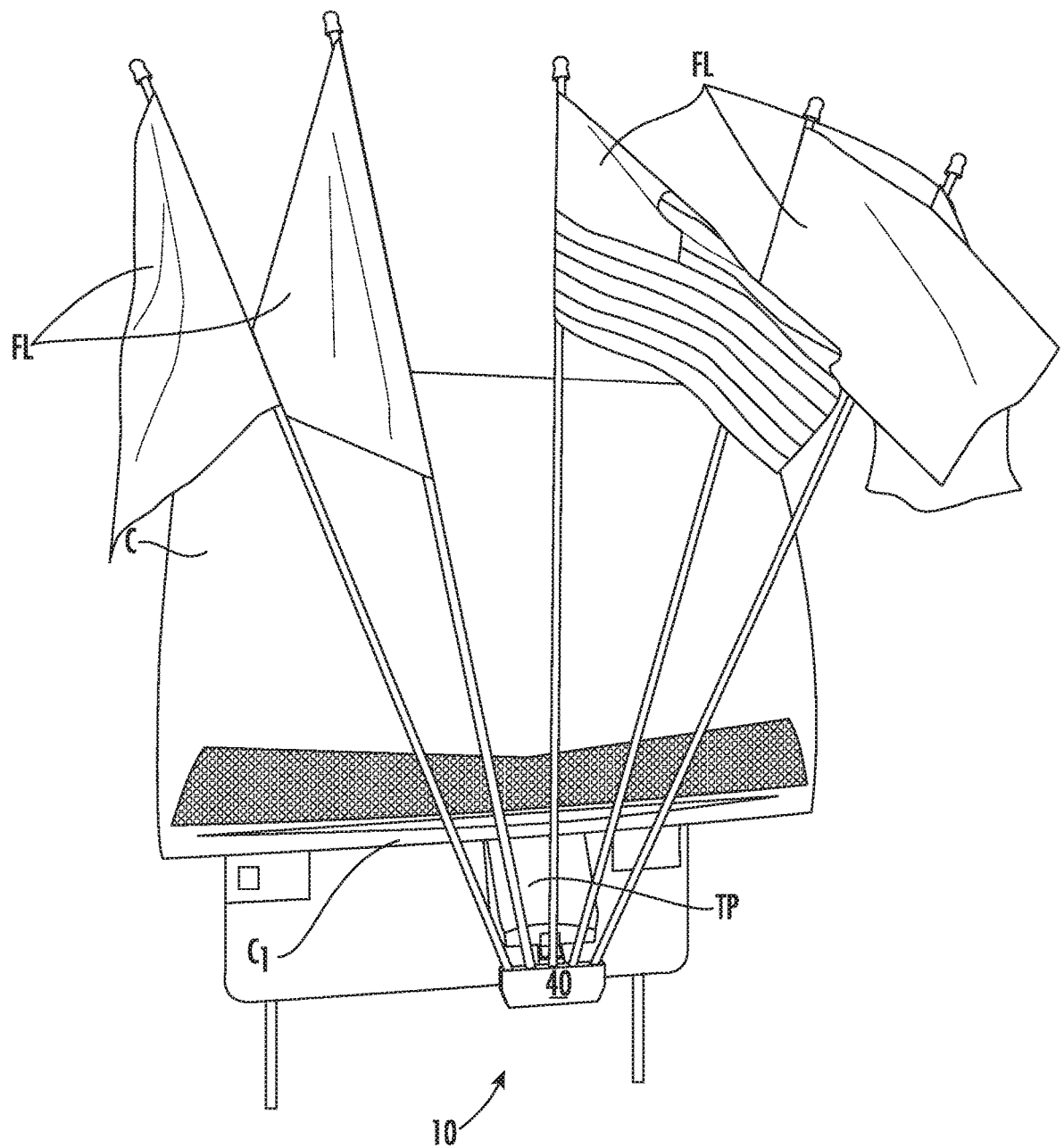
FIG. 13 illustrates a front perspective view of the embodiment of the utility arm apparatus according to FIG. 1 showing an embodiment of a utility device on the utility arm apparatus in use on an embodiment of the camper.
Figure 14:
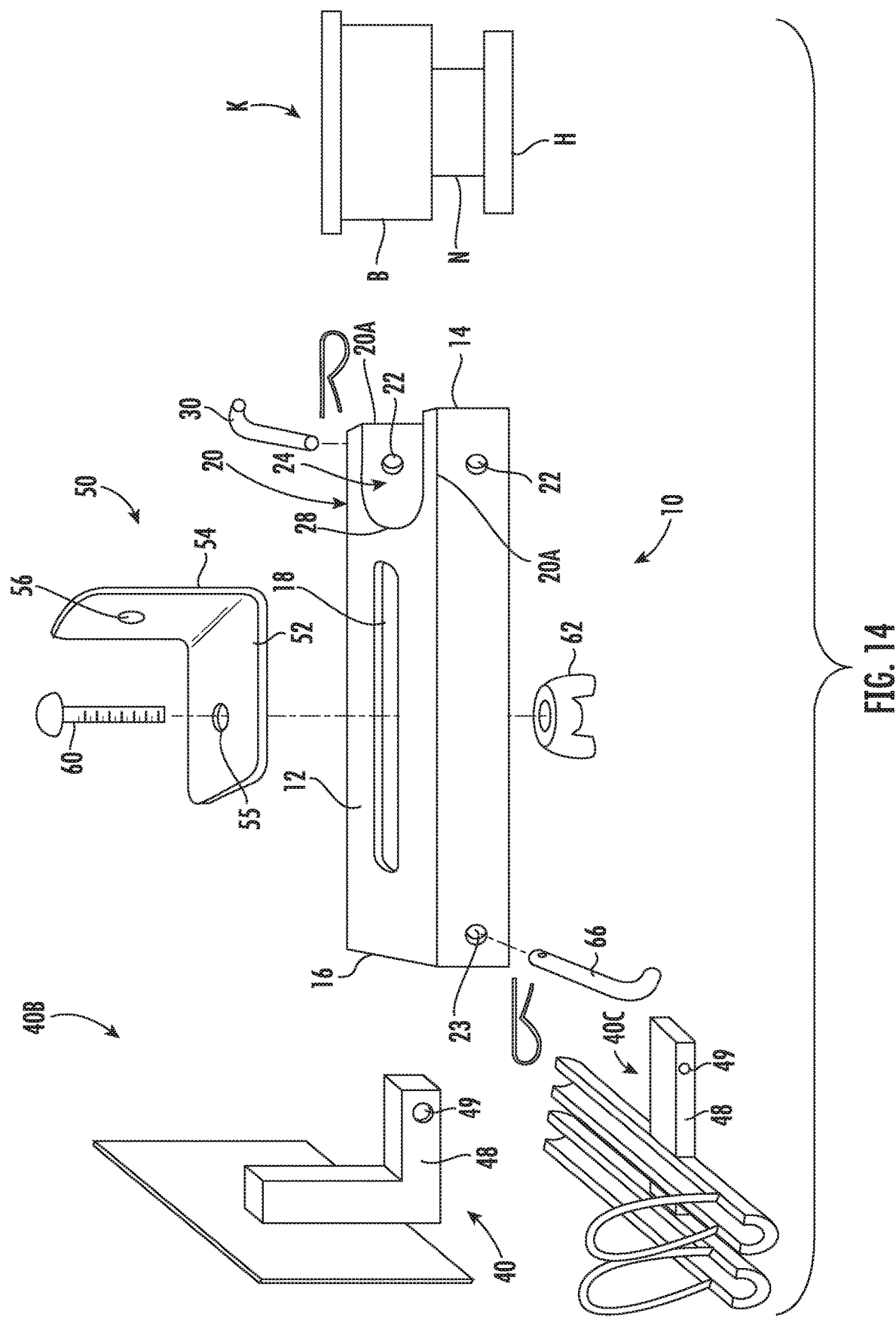
FIG. 14 illustrates an exploded perspective view of another embodiment of a utility arm apparatus according to the present subject matter with different embodiments of utility devices and a side view of an embodiment of a kingpin of a fifth wheel coupling on which the utility arm apparatus can be used.
Figure 15:
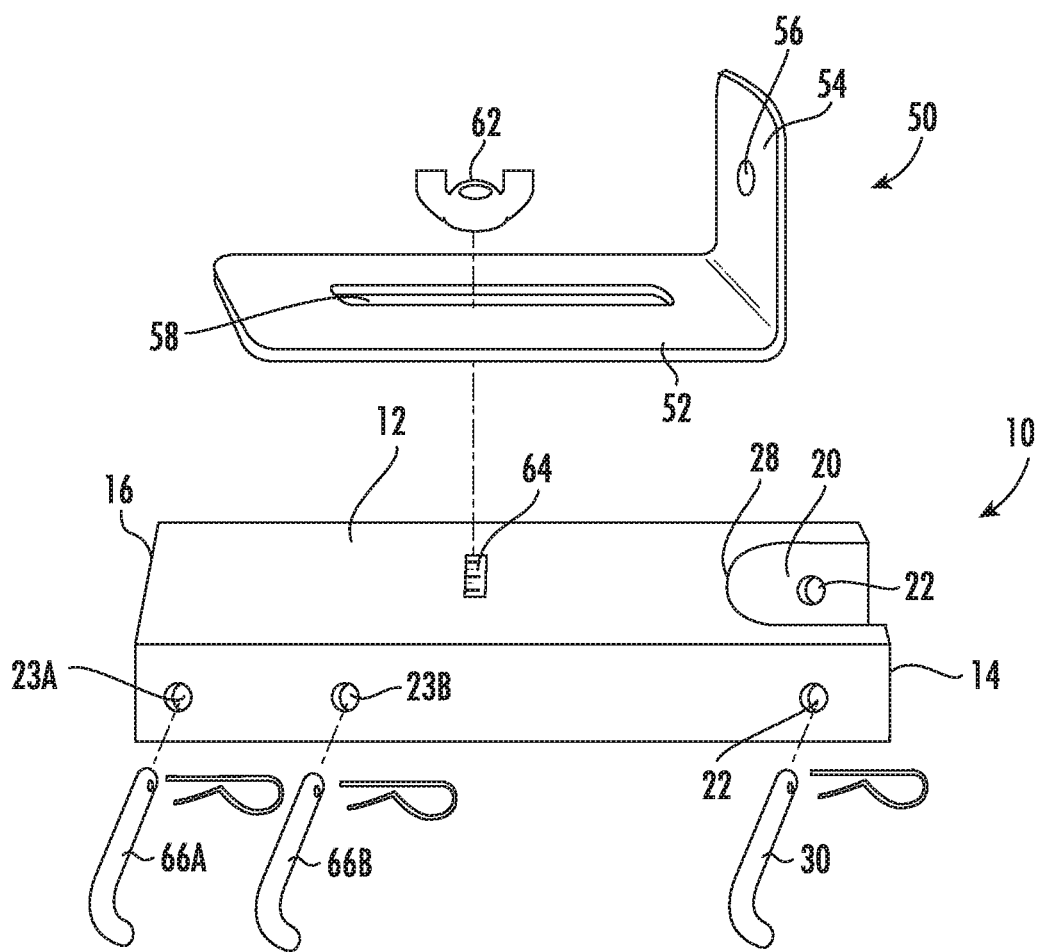
FIG. 15 illustrates an exploded perspective view of a further embodiment of a utility arm apparatus according to the present subject matter.

The utility arm apparatus 10 can further comprise a utility device, generally designated 40, secured to the utility end 16 of the elongate body 12 such that the utility device 40 is positioned past the end of the camper C when the attachment end 14 of the elongate body 12 is secured to the kingpin K of the fifth wheel coupling. For example, in some embodiments, the utility device 40 can be secured to the utility end 16 in a permanent manner, such as by welding the utility device 40 to the utility end 16 as shown in FIGS. 1-13. In some embodiments, the utility device can be molded with the elongate body during the formation of the utility apparatus. Alternatively, the utility device 40 can be secured to the utility end 16 in a less permanent manner, i.e., can be detachable, such as by the use of securement devices, such as locking pins or regular pins, nuts and bolts, screws, or the like as shown in FIGS. 14 and 15.

Figure 3A:
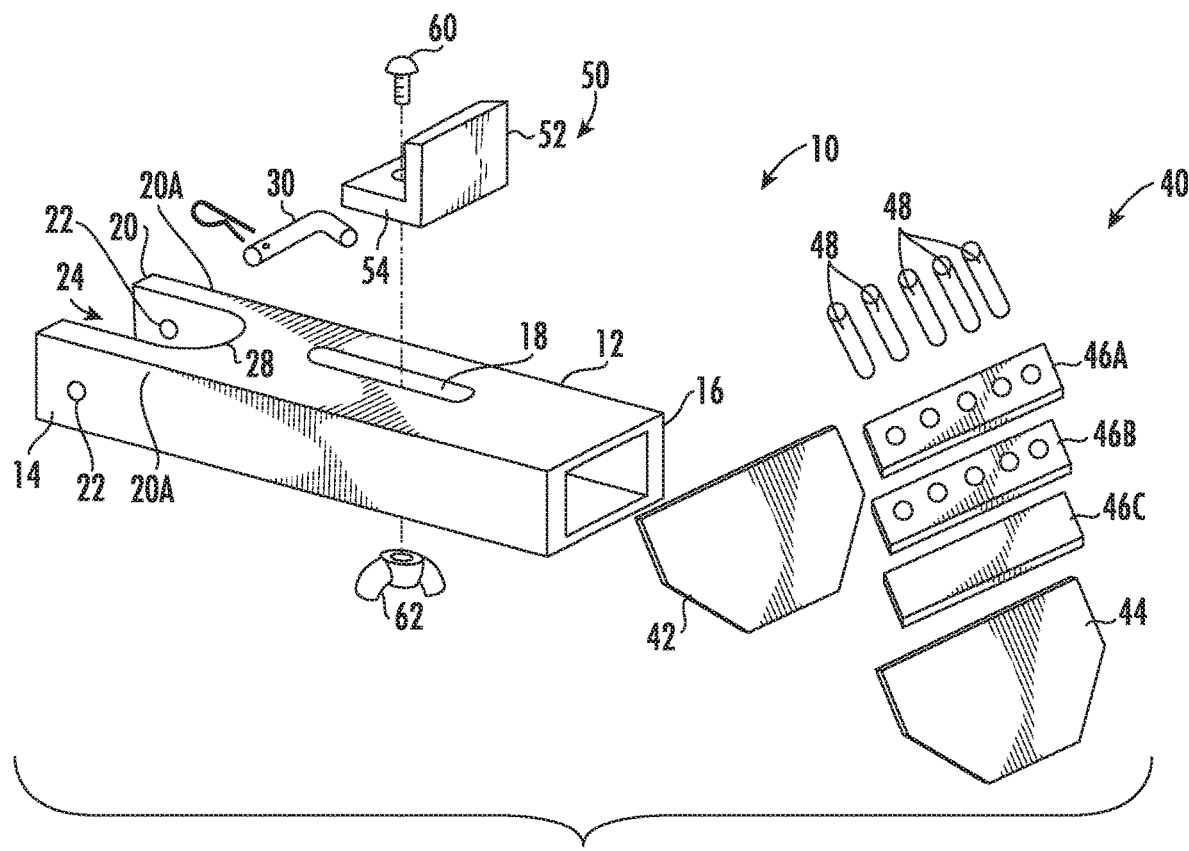
FIG. 3A is an exploded view of the embodiment of the utility arm apparatus according to FIG. 1.
Figure 3B:
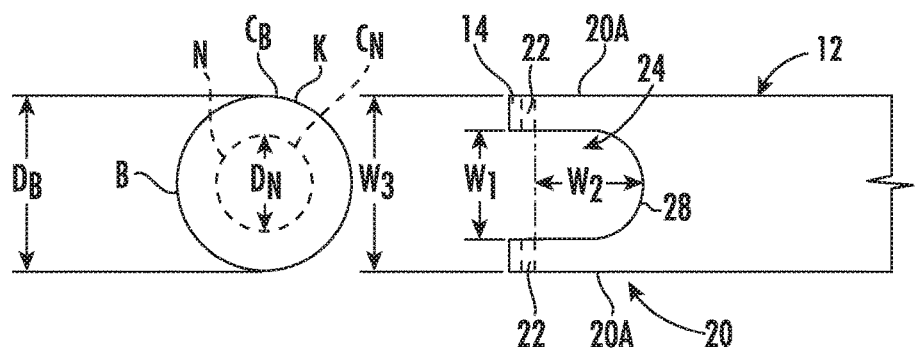
FIG. 3B is a partial top plan view of the attachment end of the elongate body of the embodiment of the utility arm apparatus according to FIG. 1 and a horizontal cross-sectional top plan view of an embodiment of a kingpin according to the present subject matter.

In the embodiment shown in FIGS. 1-13, the utility device 40 can be a flag holder 40A, or a flag tender, which can holder a plurality of flags. The flag holder 40A can comprise a back plate 42 and a front plate 44 with a top slotted guide plate 46A, an intermediate slotted guide plate 46B, and a bottom plate 46C secured between the front plate 44 and the back plate 42. The slot apertures 47A and 47B in the top slotted guide plate 40A and the intermediate slotted guide plate 46B can be staggered in a fan alignment so that the flags FL placed therein extend in a fanned arrangement as shown in FIG. 13. The bottom plate 46C can be solid to provide an abutment for the end of the flag poles inserted into the slot apertures in the top slotted guide plate 46A and the intermediate slotted guide plate 46B. In some embodiments, the slot apertures 47A and 47B in the top slotted guide plate 46A and the intermediate slotted guide plate 46B can have piping 48 as seen in FIG. 3A secured therein for extra guidance of insertion and holding of the flag poles of the flags FL.

In other embodiments, the utility device 40 can be other types of mechanism, apparatuses, or devices. For example, the utility device 40 can comprise commercial signage that is be used to identify the owner or the contents of a trailer or semi-trailer. For some embodiments, the utility device can be other types of sign displays that can be used with such trailers or campers C. In some embodiments, the utility device 40 can comprise apparatuses such as a bike rack, a grill or the like.

As shown in FIGS. 1-5, when the attachment end 14 is positioned such that the recess portion 20 fits within the groove defined by the neck portion N of the kingpin K of the fifth wheel coupling. In particular, the sidewalls 20A of the recess portion 20 fit around the neck portion N of the kingpin K of the fifth wheel coupling between a body portion B and a head H of the kingpin K to hold the utility arm apparatus 10 to the kingpin K and the camper C. The recess portion 20 can have a semi-circular base end 28 that can be shaped in the same or similar circumference as circumference $C_N$ of the neck N of the kingpin K as shown in FIG. 3B. When the semi-circular end 28 of the recess portion 20 abuts against the neck portion N, the opposing ends of the sidewalks 20A can extend past the neck portion N such the locking pin 30 apertures 22 are exposed. For example, in some embodiments, the apertures 22 can be aligned in a position that is parallel to a tangent line of the neck portion N. In particular, the apertures 22 can be aligned such that the locking pin 30 can be inserted through the apertures 22 and in close proximity to the neck with the looking pin 30 passing between the body portion B and the head H along the neck portion N. In some embodiments, the locking pin 30 can abut against the neck portion N.

As shown in FIG. 38, the recess 24 can have a width $W_1$ between the ends of the opposing sidewalls 20A. The recess 24 can have a depth $W_2$ between a center line between an inner end of the apertures 22 (with the center line representing the position of a portion of a locking pin closest to the base end 28 would be when the locking pin 30 is inserted) and the center portion of the semi-circular end 28. The width $W_1$ and the depth $W_2$ of recess 24 can be equal, or substantially equal, in distance. Further, the width $W_1$ and the depth $W_2$ of recess 24 can be slightly larger than a diameter $D_N$ of the neck portion N (shown in dashed lines in FIG. 3B) of kingpin K but less than a diameter of a head H of the kingpin K and a diameter of the body portion B of the kingpin K. For example, in the embodiment shown in FIG. 3B, the body portion B and the head H (see FIG. 2, not shown in FIG. 3B) of the kingpin K can have the same cross-sectional circumference $C_B$. This circumference $C_B$ can be greater than the circumference of the semi-circular portion of the base end 38. Thus, the body portion B and the head portion H (see FIG. 2, not shown in FIG. 3B) of the kingpin K can have the same diameter $D_B$ that is greater than the width $W_1$ and the depth $W_2$ of recess 24. Further, the elongate body 12 can have a width $W_3$ as measured from the outer surfaces of the sidewalls 20A. In some embodiments, the width $W_3$ of the elongate body 12 can be the same or similar distance as the diameter $D_B$ of the body portion B and the head H of the kingpin K. In some embodiments, the width $W_3$ can be greater than the diameter $D_B$. It is noted that diameter of the body portion B and the head H of the kingpin K do not have to be same, but both of the diameters of the body portion B and the head H of the kingpin K whether the same distance or a different distance will always be greater than width $W_1$ and the depth $W_2$ of recess 24.

Thus, the distance between a base end of the recess portion in the attachment end of the elongate body and the locking pin when the locking pin is inserted into the apertures in the sidewalls is proximal to the diameter of the neck of the kingpin. However, this distance between a base end of the recess portion in the attachment end of the elongate body and the locking pin when the looking pin is inserted into the apertures in the sidewalls is less than a diameter of a lower body portion or head portion of the kingpin of the fifth wheel coupling.

As shown in FIGS. 1-8 and 10-12, in some embodiments, the utility arm apparatus 10 can comprise an abutment brace 50 that is securable to the elongate body 12. The abutment brace 50 can be configured to abut against a portion of a trailer, such as the towing package TP of the camper C to facilitate the holding of the utility end 16 in a stationary position when the attachment end 14 of the elongate body 12 is secured to the kingpin K by abutting the base end 28 of the recess portion 20 against the circumferential surface of the neck portion N between the body portion B and the head H of the kingpin K and the locking pin 30 info the apertures 22 such that at least a portion of the locking pin 30 is between the body portion B and the head H of the kingpin K. To keep the utility arm apparatus 10 from rotating, abutment brace 50 can be secured between the attachment end 14 and the utility end 16 of the elongate body 12 in a position so that the abutment brace 50 abuts against a portion of the trailer to which the utility arm apparatus 10 is attached, such as a portion of the towing package TP of the camper (or trailer) of which the kingpin K is a part or a wall of the end of the camper from which the utility arm apparatus 10 extends. The abutment brace 50 can have a width that prevents rotation of the utility arm apparatus 10 about the kingpin K when the abutment brace 50 is pressed against a portion of the trailer to which the utility arm apparatus 10 is attached.

In some embodiments, the abutment brace 50 can be adjustable. For example, the elongate body 12 can have a slot 18 as shown in FIGS. 3A, 7, 10, and 11 that extends lengthwise between the attachment end 14 and the utility end 16 of the elongate body 12. The slot 18 can be engaged by a portion of the abutment brace 50 to permit the abutment brace 50 to be adjustable along the elongate body 12 between the attachment end 14 and the utility end 16. For example, the abutment brace 50 can have a bolt or screw 60 that can extend through the slot 18 and engage the abutment brace 50 and can be tightened to hold the abutment brace 50.

Figure 6:
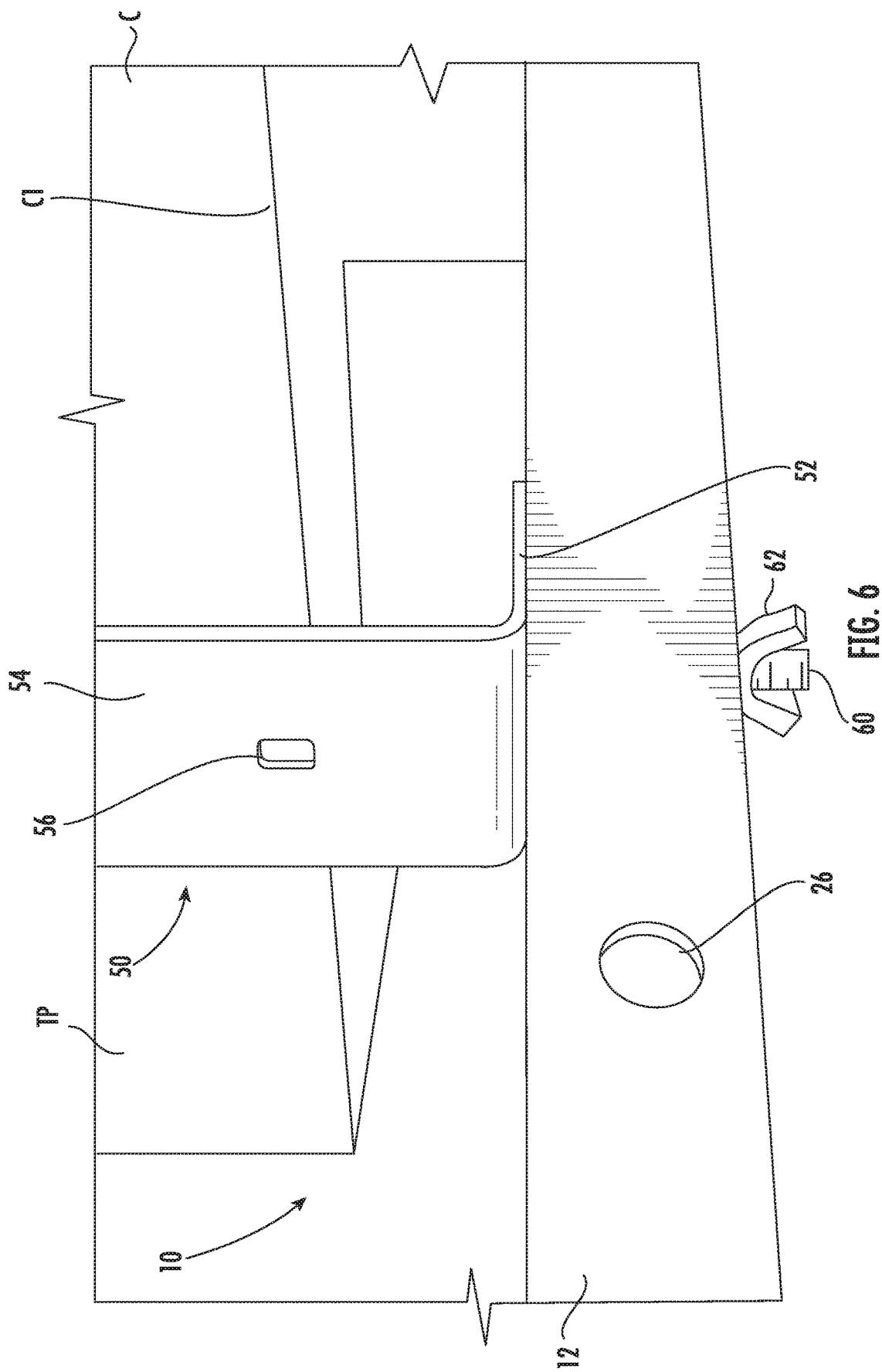
FIG. 6 illustrates an intermediate side perspective view of the embodiment of the utility arm apparatus according to FIG. 1.
Figure 7:
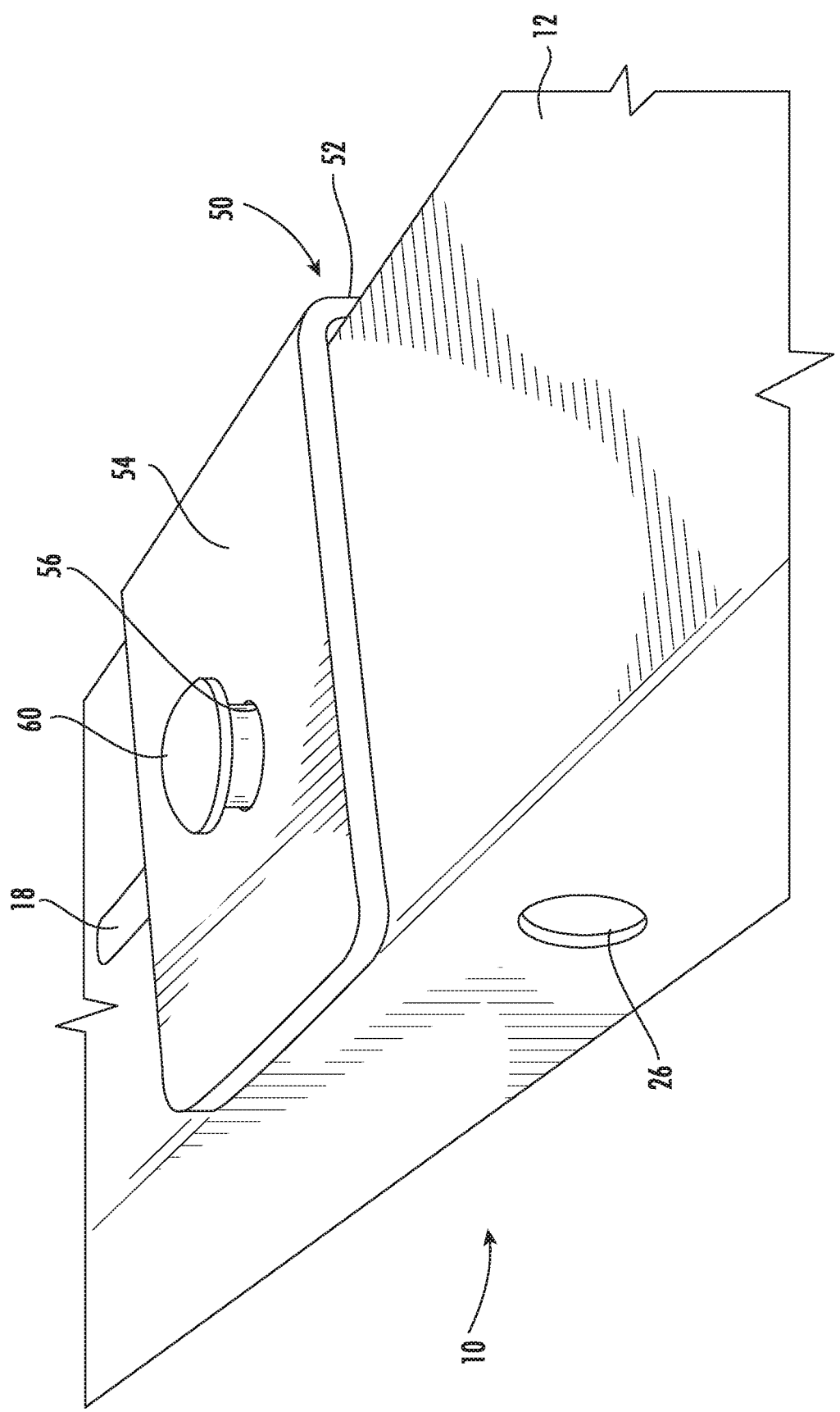
FIG. 7 illustrates an intermediate side perspective view of the embodiment of the utility arm apparatus according to FIG. 1 with an embodiment of an abutment brace in a storage position according to the present subject matter.
Figure 8:
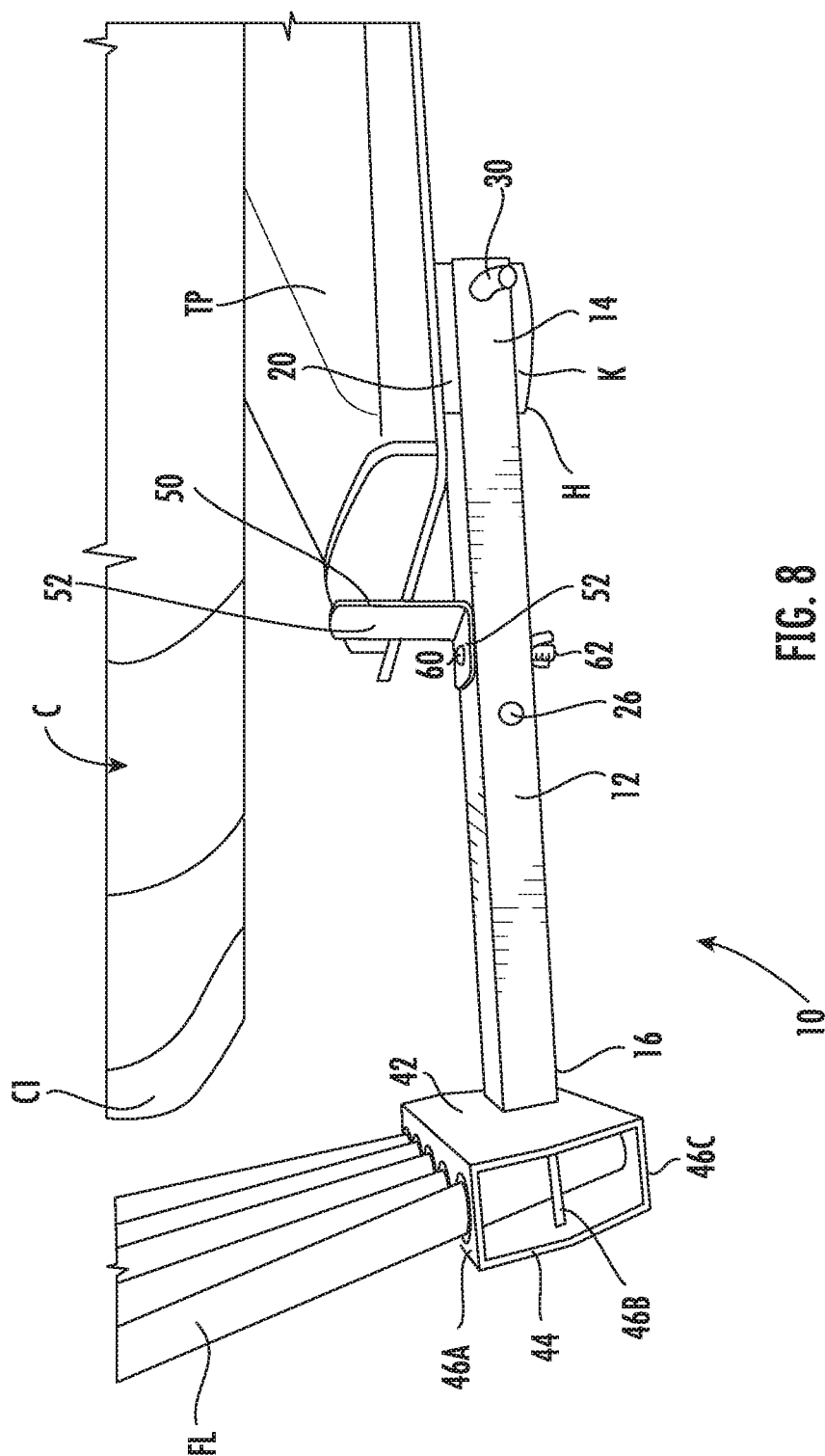
FIG. 8 illustrates another side perspective view of the embodiment of the utility arm apparatus according to FIG. 1.
Figure 9:
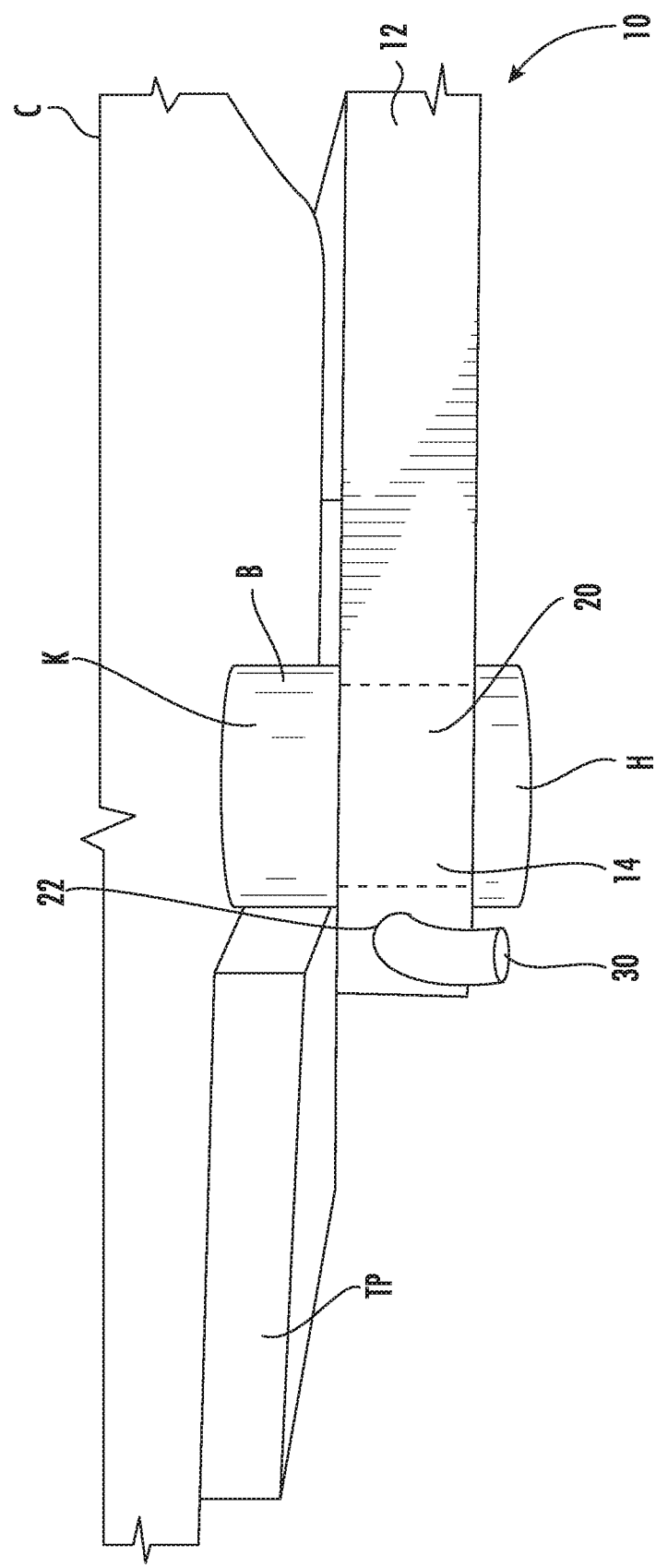
FIG. 9 illustrates another rear side perspective view of the embodiment of the utility arm apparatus according to FIG. 1.
Figure 10:
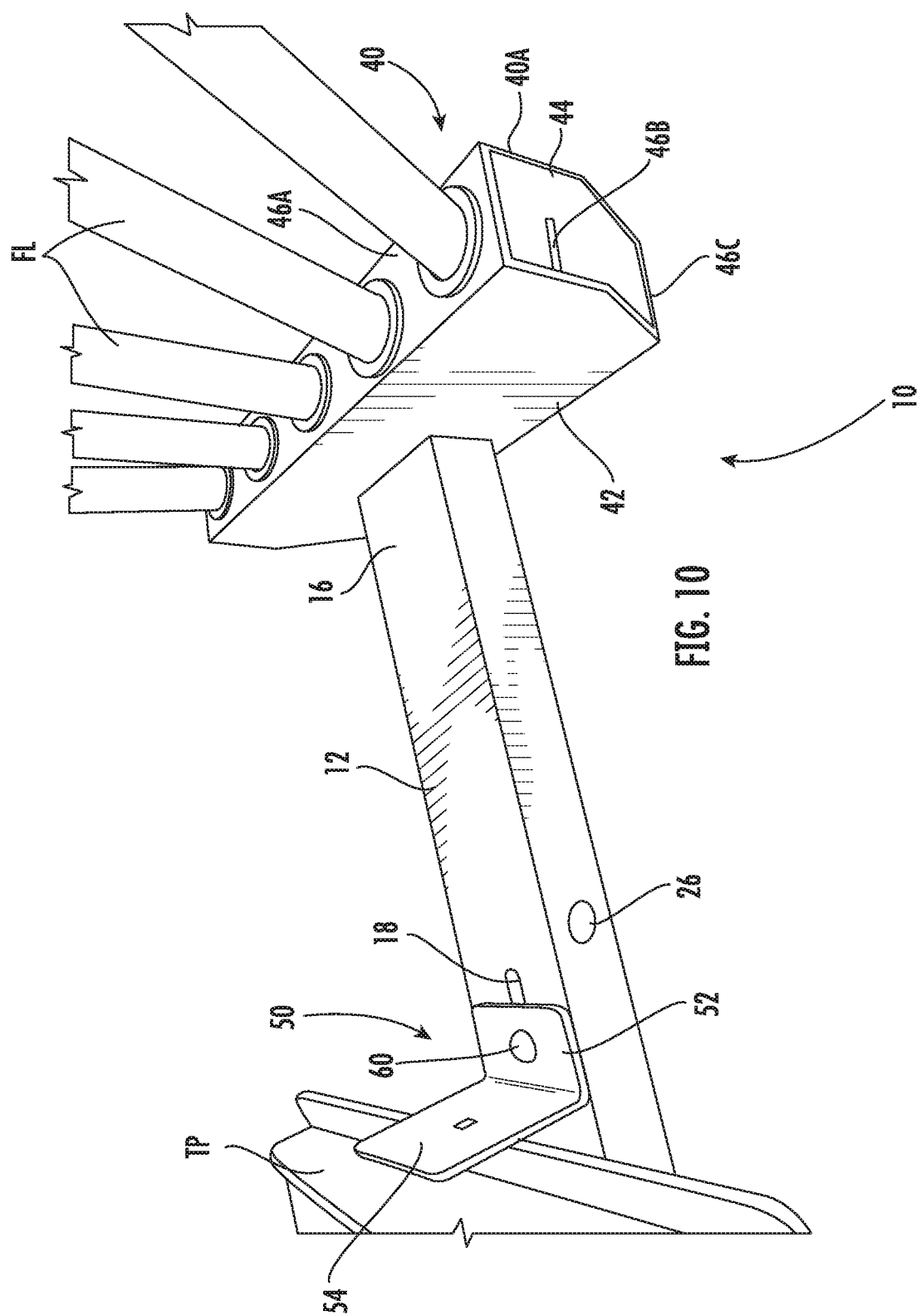
FIG. 10 illustrates a top side perspective view of the embodiment of the utility arm apparatus according to FIG. 1.
Figure 11:
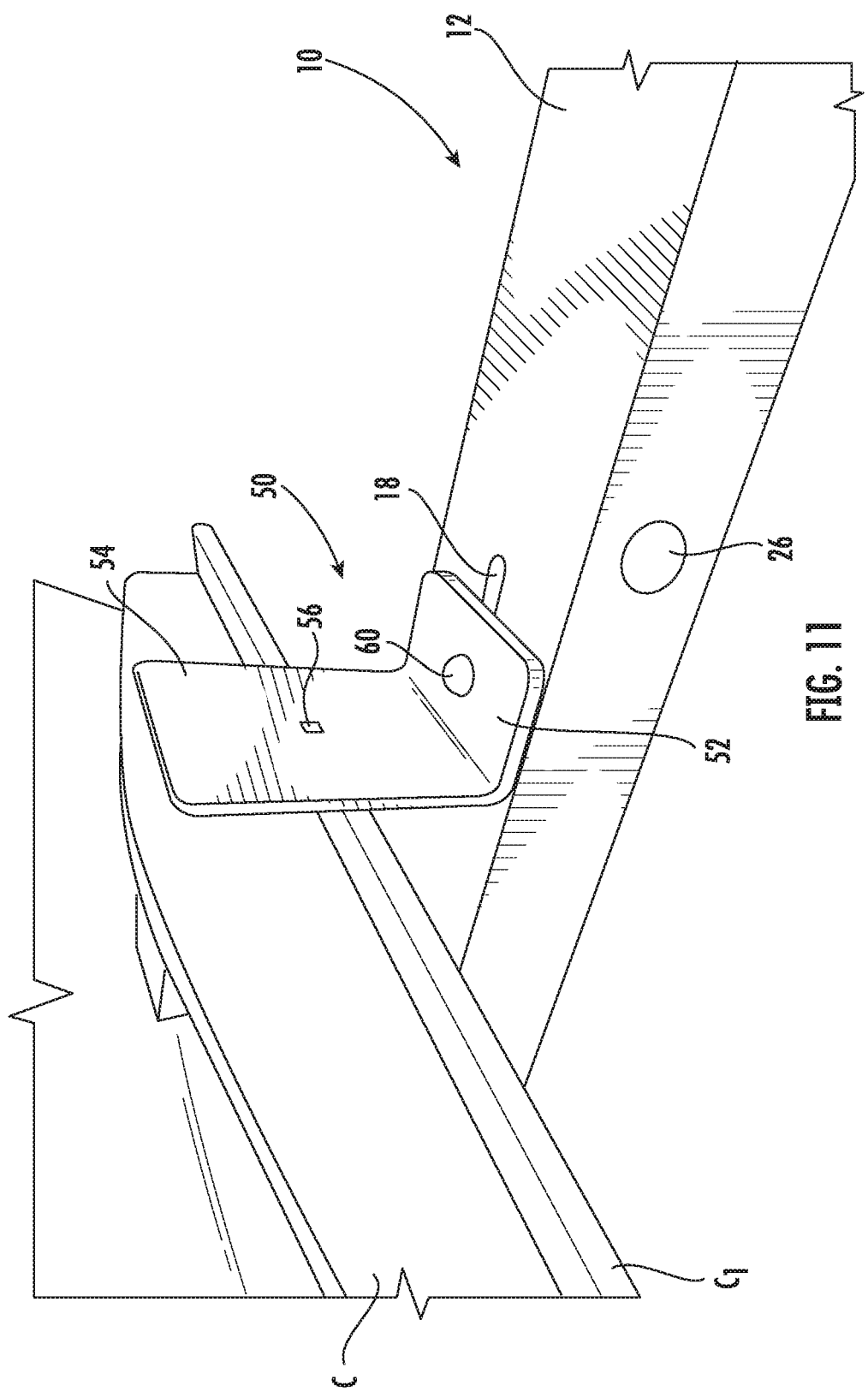
FIG. 11 illustrates another intermediate side perspective view of the embodiment of the utility arm apparatus according to FIG. 1.
Figure 12:
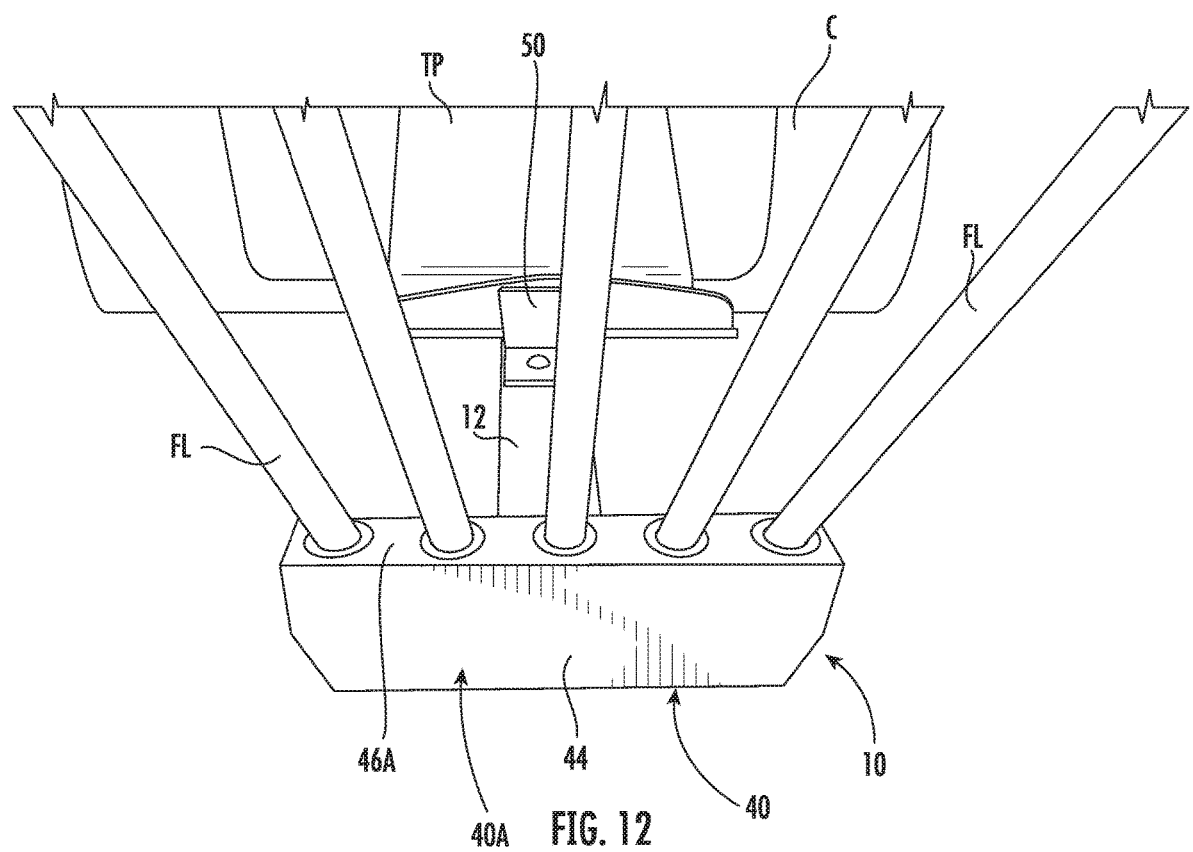
FIG. 12 illustrates another front perspective view of the embodiment of the utility arm apparatus according to FIG. 1.

For example, in some embodiments, the abutment brace 50 can comprise a base portion 52 that is securable to the elongate body 12 and an abutment portion 54 that extends upward from the base portion 52 and can engage the outer portion, such as a wall, of the end of the camper C or an outer portion of the towing package to which the kingpin K is apart when the abutment brace 50 is secured to the elongate body 12 and the camper C. In some embodiments as shown in FIG. 15 and described in more detail below, the base portion 52 of the abutment brace 50 can be elongated and can comprise a slot that can be engaged with the elongate body 12 to permit the abutment brace 50 to be adjustable along the elongate body 12 between the attachment end 14 and the utility end 16. The abutment portion 54 can have a securement aperture 56 as shown in FIGS. 1, 6, and 7 that can be used to secure the abutment brace 50 to the elongate body 12 to make the utility arm apparatus 10 easier to store. As shown in FIG. 7, the abutment brace 50 can be placed downward so that securement aperture 56 aligns with the slot 18 and neither the base portion 52 nor the abutment portion 54 extend upward or protrude outward to any great degree. The bolt 60 can be inserted through the securement aperture 56 to hold the abutment brace 50 to the elongate body 12 so that the utility arm apparatus 10 can be more easily stored.

Figure 5:
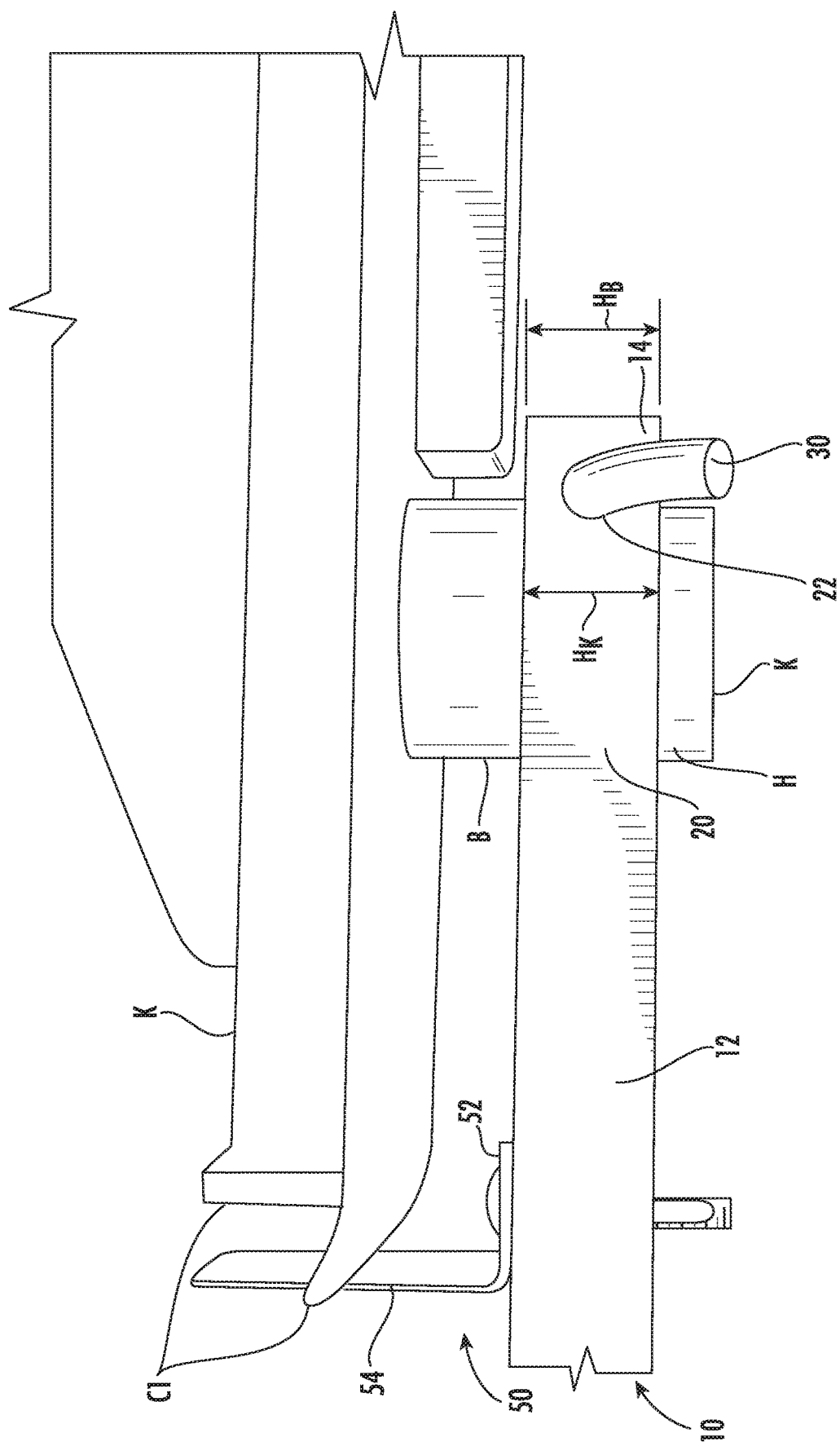
FIG. 5 illustrates a rear side perspective view of the embodiment of the utility arm apparatus according to FIG. 1.

Thus, as outlined above, the recess 24 in the elongate body 12 of the utility arm apparatus 10 can have a width and depth that corresponds to a circumference $C_N$ of the neck N of the kingpin K of the fifth wheel coupling between the lower body portion B and the head H of the kingpin K. In particular, the recess 24 in the recess portion 20 in the attachment end 14 of the elongate body 12 (as shown in FIGS. 3A, 3B, 14 and 15) can be configured to be contoured to fit the neck N of the kingpin K of the fifth wheel coupling to support the utility arm apparatus 10. The apertures 22 can be aligned with each other so that the locking pin 30 can fit between the lower body portion B and the head H of the kingpin K along the neck N of the kingpin K. For example, the distance between a base end 28 of the recess portion 20 in the attachment end 14 of the elongate body 12 and the locking pin 30 when the locking pin 30 is inserted into the apertures 22 can be a larger distance than the diameter $D_N$ of the neck N of the kingpin K but at the same time can be less than a diameter $D_B$ of a body portion B or head portion H of the kingpin K of the fifth wheel coupling. In some embodiments, the depth $W_2$ between a base end 28 of the recess portion 20 in the attachment end 14 of the elongate body 12 and the locking pin 30 when the locking pin 30 is inserted into the apertures 22 can be only a slightly larger distance than the diameter $D_N$ of the neck N of the kingpin K that allows easy insertion of the locking pin 30 when the semicircular base end 28 is firmly pressed against the circumference $C_N$ of the neck N but provides a snug fit between the locking pin 30 and a tangential portion of the circumference $C_N$ of the neck N of the kingpin K when the locking pin 30 is inserted into the apertures 22 in the sidewalls 20A. Additionally, to aid in tightly securing the utility arm apparatus 10 to the kingpin K, the elongate body 12 can have a thickness $H_B$ that corresponds to a thickness $H_K$ of the neck N of the kingpin K of the fifth wheel coupling to provide a tight fit of the recess portion 20 on the kingpin K as shown in FIG. 5. The thickness $H_K$ of the neck N of the kingpin K can be slightly larger than the thickness $H_B$ of the recess portion 20 such that the recess portion 20 can be slid onto the neck portion N of the kingpin K with the neck being received tightly in the recess 24.

The elongate body 12 of the utility arm apparatus 10 can comprise different types of material as long as the elongate body 12 can withstand the cantilever, moment and torque forces placed upon it after attachment to the kingpin K and during use of the respective utility device 40 secured to the utility end of the elongate body 12 of the utility arm apparatus 10. For example, for certain embodiments, the elongate body 12 can comprise a sturdy, hard plastic material. In some embodiments, the elongate body 12 can comprise a metal. For instance, the elongate body 12 can comprise an aluminum or aluminum alloy. For example, the elongate body 12 can comprise ⅛ of an inch gauged aluminum grade. The elongate body 12 can be constructed from a single unitary piece of aluminum. Alternatively, in some embodiments, the elongate body 12 can comprise a plurality of pieces welded together to form a singular integral elongate foody 12 of the utility arm apparatus 10.

Figure 16:
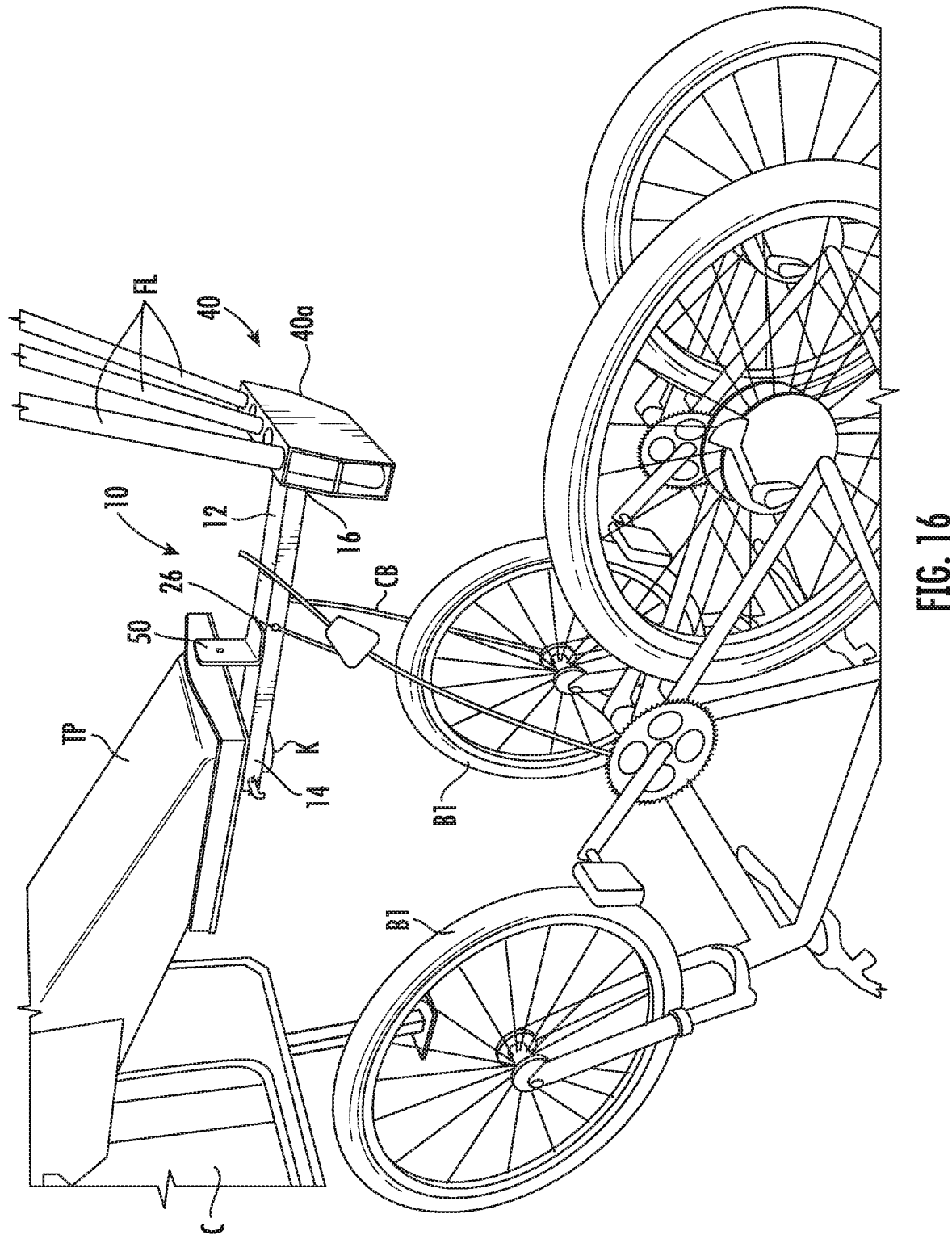
FIG. 16 illustrates a perspective view of an embodiment of a utility arm apparatus according to the present subject matter in use on an embodiment of a camper.

Further, in some embodiments, the elongate body 12 can comprise a looking aperture 26 that permits items to be secured to the utility arm apparatus 10. For example, the locking aperture 28 of the elongate body 12 can be sized to allow a chain or metal cord to pass therethrough to allow bikes, grills or other items to be secured to the utility arm apparatus 10. For example, bikes, grills, or other portable items can be locked to the utility arm apparatus 10 with a cord, chain, cable, portion of a lock or the like passing through the locking aperture 26. For example, once the cord, chain, or cable is wrapped around the item to be secured and an end is passed through the locking aperture 26, the ends of the cord, chain, or cable can be locked together by a lock. As shown in FIG. 16, the elongate body 12 of utility arm apparatus 10 can have the locking aperture 26 therein. A cable CB can be inserted through the locking aperture 26 and around one or more bikes BI with the ends of the cable CB being locked together to prevent unauthorized use of the bikes BI.

Referring to FIG. 14 in more detail, another embodiment of a utility arm apparatus, generally designated 10, is shown in an exploded view. Similar to the embodiments described above, the utility arm apparatus 10 comprising an elongate body 12 having an attachment end 14 and a utility end 16. The attachment end 14 can comprise a recessed portion 20 for receiving a neck portion N of a kingpin K of a fifth wheel coupling such that the utility end 16 extends outward from the kingpin K of the fifth wheel coupling past an end of a trailer from which the kingpin K extends. Additionally, the utility arm apparatus 10 can also comprise a locking pin 30 for insertion into apertures 22 in the recess portion 20 for securing the kingpin K at the attachment end 14. As with the embodiment above, the elongate body 12 of the utility arm apparatus 10 as shown in FIG. 14 can comprise a width that corresponds to a width of the neck N of the kingpin K of the fifth wheel coupling between the lower body portion B and the head H of the kingpin K. In particular, the recess 24 in the recess portion 20 in the attachment end 14 of the elongate body 12 can be configured to be contoured to fit the neck N of the kingpin K of the fifth wheel coupling to support the utility arm apparatus 10. The apertures 22 can be aligned with each other so that the locking pin 30 can fit between the lower body portion B and the head H of the kingpin K along the neck N of the kingpin K. For example, as described above, the distance between a base end 28 of the recess 24 of the recess portion 20 in the attachment end 14 of the elongate body 12 and the locking pin 30 when the locking pin 30 is inserted into the apertures 22 can be generally about the same distance of the diameter of the neck N of the kingpin K but at the same time can be less than a diameter of a lower body portion B or head portion H of the kingpin K of the fifth wheel coupling.

The utility arm apparatus 10 can further comprise a utility device, generally designated 40, secured to the utility end 16 of the elongate body 12. As shown in FIG. 14, two utility devices 40 can be provided that can be secured to the utility end 16 in a less permanent manner, such as by a locking pin 66. For example, the utility device 40 can be a sign display 40B. The utility device 40 can have a support arm 48 that can be inserted into a holding receptacle in the utility end 16 of the elongate body 12. The support arm 48 can have a receiving aperture 49 and the utility end 16 of the elongate body 12 of the utility arm apparatus 10 can have one or more holding apertures 23 that extend into the holding receptacle and can be aligned with the receiving aperture 49 in the support arm 48 of the utility device 40 when the support arm 48 is inserted into the holding receptacle in the utility end 16 of the elongate body 12. A locking pin 66 can be inserted through the apertures 23 and the receiving aperture 49 to hold the utility device 40 to the utility arm apparatus 10.

In the embodiment shown in FIG. 14, the utility device 40 can be the sign display 40B that can be used to provide information, for example, about the contents of the trailer to which the utility arm apparatus 10 is attached. The sign display 40B can be commercial signage for identifying the trailer or the owner of the trailer, or can be used for advertisements when the trailer to which the utility arm apparatus 10 is attached is not in use. As another example, the utility device 40 can be a bike rack 40C that has a support arm 48 with a receiving aperture 49 for receiving a locking pin 66 when the support arm 48 is inserted info the holding receptacle in the utility end 16 of the elongate body 12.

Thereby, a utility arm apparatus 10 with one or more exchangeable utility devices 40B, 40C can be provided. With the utility end 16 of the elongate body 12 having a holding receptacle for receiving a utility device 40B, 40C, the utility device can be attachable to and detachable from the utility end 16 of the elongate body 12. A support arm 48 of a detachable utility device 40B, 40C can be simply inserted into the holding receptacle of the utility end 16 of the elongate body 12 to secure the detachable utility device 40B, 40C to the elongate body 12. One or more locking pins 66 can secure the utility device 40B, 40C to the elongate body as described above.

As shown in FIG. 14, in some embodiments, the utility arm apparatus 10 can comprise an adjustable abutment brace 50 having a base portion 52 and an abutment portion 54. The base portion 52 of the abutment brace 50 can be secured to the elongate body 12. For example, the elongate body 12 can have a slot 18 that extends lengthwise between the attachment end 14 and the utility end 16 of the elongate body 12. The abutment brace 50 can have a bolt 60 that can extend through a bolt aperture 55 in the base portion 52. The bolt 50 can extend through the slot 18 in the elongate body 12 that can be engaged by a wing nut 62 which can be tightened to hold the abutment brace 50 in place after abutment brace 50 has been moved to a position where the abutment portion 54 resides against an end of the trailer to which the kingpin K is attached. The abutment brace 50 can also have a securement aperture 56 in the abutment portion 54 for insertion of the bolt when the abutment brace 50 is put into a storage position for holding the abutment brace 50 to the elongate body 12 for storage of the utility arm apparatus 10.

Similarly, FIG. 15 shows a further embodiment of a utility arm apparatus, generally designated 10, that is also shown in an exploded view. Similar to the embodiments described above, the utility arm apparatus 10 comprising an elongate body 12 having an attachment end 14 and a utility end 16. The attachment end 14 can comprise a recessed portion 20 for receiving a neck portion of a kingpin of a fifth wheel coupling. The utility arm apparatus 10 can also comprise a locking pin 30 for insertion into apertures 22 in the recess portion 20 for securing the kingpin at the attachment end 14. As shown in FIG. 15, the utility arm apparatus 10 can further comprise means and devices that permit a utility device to be secured to the utility end 16 of the elongate body 12. For example, the utility arm apparatus 10 can have two holding apertures 23A and 23B through which two locking pins 66A and 66B can be inserted to hold and stabilize a utility device, such as a flag holder, a sign display, a bike rack, a grill or the like, to the utility arm apparatus 10.

As shown in FIG. 15, in some embodiments, the utility arm apparatus 10 can comprise an adjustable abutment brace 50 having a base portion 52 and an abutment portion 54. The base portion 52 of the abutment brace 50 can be secured to the elongate body 12. For example, the base portion 52 of the abutment brace 50 can be elongated and can comprise a slot 58 that can be engaged with the elongate body 12 to permit the abutment brace 50 to be adjustable along the elongate body 12 between the attachment end 14 and the utility end 16. The elongate body 12 can have a bolt that can extend therethrough, or a thread peg 64 secured to an upper portion of the elongate body 12. The bolt or the peg 64 can be slideably received by the slot 58 in the base portion 52 of the abutment brace 50. The bolt or the peg 64 in or on the elongate body 12 can extend through the slot 58 in the base portion 52 of the abutment brace 50 and can be engaged by a wing nut 62 which can be tightened to hold the abutment brace 50 in place after abutment brace 50 has been moved to a position where the abutment portion 54 resides against an end of the trailer to which the kingpin is attached. As described above, the abutment brace 50 can also have a securement aperture 56 in the abutment portion 54 for insertion of the peg 64 when the abutment brace 50 is put into a storage position for holding the abutment brace 50 to the elongate body 12 for storage of the utility arm apparatus 10.

In use after a camper or other trailer is parked and the kingpin of the fifth wheel coupling has been detached from the latch assembly of the fifth wheel coupling secured to the towing vehicle, a user may then attach the utility arm apparatuses described above, to the kingpin of the fifth wheel coupling on the camper or other trailer. The recess portion can be slid onto the neck portion of the kingpin such that the neck is received in the recess. A locking pin can then be inserted into the apertures in the recess portion of the attachment end of the elongated body of the utility arm apparatus to secure the utility arm apparatus to the kingpin. The abutment brace can be secured against an end portion of the camper or other trailer in an appropriate manner as described above. The utility device that can be attached to the utility arm apparatus can then be used by the user for its intended purpose.

Thus, a method of securing utility devices to a kingpin of a fifth wheel of a trailer is provided. The method includes providing utility arm apparatus as described above. In particular, the utility arm apparatus comprises an elongate body having an attachment end and a utility end. The attachment end comprises a recessed portion that includes sidewalls for receiving a neck portion of a kingpin of a fifth wheel coupling secured to a trailer. The sidewalls of the recessed portion can have apertures therethrough for receiving a locking pin. The utility arm apparatus also comprises a utility device secured to the utility end of the elongate body, in securing the utility arm apparatus to the fifth wheel, the recessed portion of the elongate body is placed around the neck portion of the kingpin of the fifth wheel such that the apertures in the side walls are visible on an opposite side of the neck portion. A locking pin can then be inserted into apertures in the sidewalls of the recess portion for securing the elongate body to the kingpin at the attachment end with the elongate body extending outward from the kingpin such that the utility device is positioned past the end of the trailer when the attachment end of the elongate body is secured to the kingpin of the fifth wheel coupling.

When a user is securing the utility arm apparatus to the fifth wheel, an abutment brace can be secured to the elongate body such that the abutment brace abuts against a portion of the trailer to hold the utility end of the elongate body in a stationary position. The abutment brace can be adjusted along the elongate body to engage the portion of the frailer as described above.

As described in detail above, the recessed portion of the elongate body of the utility arm apparatus can have a semi-circular base end that is configured to receive a circumferential surface of the neck portion of the kingpin and an open end at ends of the sidewalls of the recess portion proximate to the apertures for receiving the locking pin opposite the base end. The recessed portion of the elongate body can be placed around the neck portion of the kingpin. In particular, the neck portion can be inserted in the open end of the recessed portion so that the semi-circular end of the recessed portion abuts against the circumferential surface of the neck portion of the kingpin.

These and other modifications and variations to the present subject matter may be practiced by those of ordinary skill in the art, without departing from the spirit and scope of the present subject matter, which is more particularly set forth herein above. In addition, it should be understood the aspects of the various embodiments may be interchanged both in whole or in part. Furthermore, those of ordinary skill in the art will appreciate that the foregoing description is by way of example only, and is not intended to limit the present subject matter.

What is claimed is:

1. A utility arm apparatus for securement to a kingpin of a fifth wheel coupling of a trailer, the utility arm apparatus comprising:
    an elongated body comprising an attachment end and a utility end, the attachment end comprising a recessed portion having sidewalls that extend outward forming an open end of the recessed portion for receiving a neck portion of a kingpin of a fifth wheel coupling secured to the trailer such that the utility end extends outward from the kingpin of the fifth wheel past an end of the trailer;
    a locking pin for insertion into apertures in the sidewalls of the recess portion for securing the elongated body to the kingpin at the attachment end; and
    a utility device secured to the utility end of the elongated body such that the utility device is positioned past the end of the trailer when the attachment end of the elongated body is secured to the kingpin of the fifth wheel coupling.

2. The utility arm apparatus according to claim 1, wherein a distance between a base end of the recess portion and the locking pin when the locking pin is inserted into the apertures in the sidewalls that is proximal to a diameter of the neck of the kingpin but is less than a diameter of a lower body portion or a head portion of the kingpin of the fifth wheel coupling.

3. The utility arm apparatus according to claim 1, wherein the recess portion in the attachment end of the elongated body is configured to be contoured to fit the neck of the kingpin of the fifth wheel coupling.

4. The utility arm apparatus according to claim 3, wherein the recessed portion of the elongated body of the utility arm apparatus has a semi-circular base end that is configured to receive a circumferential surface of the neck portion of the kingpin and an open end proximate to the apertures for receiving the locking pin in the sidewalls that form the recess portion.

5. A utility arm apparatus for securement to a kingpin of a fifth wheel coupling of a trailer, the utility arm apparatus comprising:
    an elongated body comprising an attachment end and a utility end, the attachment end comprising a recessed portion having sidewalls that extend outward forming an open end of the recessed portion for receiving a neck portion of a kin pin of a fifth wheel coupling secured to the trailer such that the utility end extends outward from the kingpin of the fifth wheel past an end of the trailer;
    a utility device secured to the utility end of the elongated body such that the utility device is positioned past the end of the trailer when the attachment end of the elongated body is secured to the kingpin of the fifth wheel coupling; and
    an abutment brace that is securable to the elongated body, the abutment brace configured to abut against a portion of the trailer when the attachment end of the elongated body is secured to the kingpin such that the utility end is held in a stationary position.

6. The utility arm apparatus according to claim 5, wherein the recess portion in the attachment end of the elongated body is configured to be contoured to fit the neck of the kingpin of the fifth wheel coupling.

7. The utility arm apparatus according to claim 5, wherein the abutment brace is adjustable.

8. The utility arm apparatus according to claim 7, wherein the elongated body has a slot that extend lengthwise that is engageable by a portion of the abutment brace to permit the abutment brace to be adjustable along the elongated body between the attachment end and the utility end.

9. The utility arm apparatus according to claim 7, wherein the abutment brace comprises a base portion that is securable to the elongated body and an abutment portion that extends upward from the base portion and engages a portion of the trailer when the abutment brace is secured to the elongated body.

10. The utility arm apparatus according to claim 9, wherein the base portion of the abutment brace defines a slot therein that is engagable with the elongated body to permit the abutment brace to be adjustable along the elongated body between the attachment end and the utility end.

11. The utility arm apparatus according to claim 5, wherein the elongated body comprises a thickness that corresponds to a thickness of the neck as measured between a body portion and a head of the kingpin of the fifth wheel coupling.

12. The utility arm apparatus according to claim 5, wherein the utility device comprises at least one of a flag holder, a sign display, or a bike rack.

13. The utility arm apparatus according to claim 5, wherein the utility device is detachable from the utility end of the elongated body.

14. The utility arm apparatus according to claim 13, wherein the utility end of the elongated body has a holding receptacle for receiving a support arm of a detachable utility device.

15. The utility arm apparatus according to claim 5, wherein the elongated body comprises a locking aperture that permits items to be secured to the utility arm apparatus.

16. A method of securing a utility device to a kingpin of a fifth wheel of a trailer, the method comprising the steps:
providing utility arm apparatus comprising:
an elongated body comprising an attachment end and a utility end, the attachment end comprising sidewalls that at least partially form a recessed portion for receiving a neck portion of a kingpin of a fifth wheel coupling secured to the trailer, the sidewalls having apertures therethrough for receiving a locking pin; and
a utility device secured to the utility end of the elongated body;
placing the recessed portion of the elongated body around the neck portion of the kingpin of the fifth wheel such that the apertures in the side walls are visible on an opposite side of the neck portion;
inserting a locking pin into the apertures in the sidewalls of the recess portion for securing the elongated body to the kingpin at the attachment end with the elongated body extending outward from the kingpin such that the utility device is positioned past the end of the trailer when the attachment end of the elongated body is secured to the kingpin of the fifth wheel coupling.

17. The method according to claim 16, further comprising securing an abutment brace to the elongated body such that the abutment brace abuts against a portion of the trailer to hold the utility end of the elongated body in a stationary position.

18. The method according to claim 17, wherein the step of securing the abutment brace comprises adjusting the abutment brace along the elongated body to engage the portion of the trailer.

19. The method according to claim 16, wherein the recessed portion of the elongated body of the utility arm apparatus has a semi-circular base end that is configured to receive a circumferential surface of the neck portion of the kingpin and an open end at ends of the sidewalls of the recess portion proximate to the apertures for receiving the locking pin opposite the base end and wherein the step of placing the recessed portion of the elongated body around the neck portion of the kingpin comprises inserting the neck portion of the kingpin in the open end of the recessed portion and abutting the semi-circular end of the recessed portion against the circumferential surface of the neck portion of the kingpin.

20. The method according to claim 16, wherein the utility end of the elongated body has a holding receptacle and the utility device is detachable from the utility end of the elongated body and further comprising inserting a support arm of a detachable utility device into the holding receptacle of the utility end of the elongated body to secure the detachable utility device to the elongated body.

* * * * *